United States Patent
Kusch et al.

(10) Patent No.: US 8,981,727 B2
(45) Date of Patent: Mar. 17, 2015

(54) METHOD AND APPARATUS FOR CHARGING MULTIPLE ENERGY STORAGE DEVICES

(75) Inventors: Ruediger Soeren Kusch, Clifton Park, NY (US); Robert Dean King, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 375 days.

(21) Appl. No.: 13/476,165

(22) Filed: May 21, 2012

(65) Prior Publication Data

US 2013/0307489 A1 Nov. 21, 2013

(51) Int. Cl.
*H02J 7/00* (2006.01)
*B60L 11/18* (2006.01)

(52) U.S. Cl.
CPC .......... B60L 11/1868 (2013.01); *Y02T 10/7005* (2013.01); *Y02T 10/7066* (2013.01)
USPC ........... 320/134; 320/135; 320/136; 320/162; 320/167

(58) Field of Classification Search
CPC .............. H02J 7/0003; B06L 11/1853; B06L 11/1868; Y02T 10/7072; Y02T 10/7055; Y02T 10/7066
USPC .................. 320/134–136, 153, 162, 166–167
See application file for complete search history.

(56) References Cited

U.S. PATENT DOCUMENTS

| | | | |
|---|---|---|---|
| 6,242,873 B1 | 6/2001 | Drozdz et al. | |
| 6,424,119 B1 | 7/2002 | Nelson et al. | |
| 6,769,389 B2 * | 8/2004 | Tamai et al. | 123/179.3 |
| 6,886,647 B1 | 5/2005 | Gotta | |
| 2002/0179354 A1 | 12/2002 | White | |
| 2004/0211605 A1 | 10/2004 | Botti | |
| 2005/0024015 A1 | 2/2005 | Houldsworth et al. | |
| 2006/0152189 A1 | 7/2006 | Ambrosio et al. | |
| 2008/0039281 A1 * | 2/2008 | Okuda et al. | 477/73 |
| 2008/0211230 A1 | 9/2008 | Gurin | |
| 2009/0102424 A1 | 4/2009 | Tien et al. | |
| 2009/0115371 A1 | 5/2009 | Chawla et al. | |
| 2009/0130538 A1 * | 5/2009 | Kaita et al. | 429/50 |
| 2009/0309422 A1 * | 12/2009 | Helmick | 307/53 |
| 2010/0007310 A1 | 1/2010 | Kawamoto et al. | |
| 2010/0085019 A1 * | 4/2010 | Masuda | 320/152 |
| 2010/0107994 A1 | 5/2010 | Moriarty et al. | |

(Continued)

OTHER PUBLICATIONS

Shu-Mei et al., "Study of Hybrid Energy Control Strategy for Hybrid Electric Drive System in All Electric Combat Vehicles", IEEE Vehicle Power and Propulsion Conference (VPPC), Sep. 3-5, 2008, Harbin, China, pp. 1-5.

(Continued)

*Primary Examiner* — Paul Dinh
(74) *Attorney, Agent, or Firm* — Ziolkowski Patent Solutions Group, SC; Jean K. Testa

(57) ABSTRACT

An electric vehicle includes a controller configured to receive sensor feedback from a high voltage storage device and from a low voltage storage device, compare the sensor feedback to operating limits of the respective high and low voltage storage device, determine, based on the comparison a total charging current to the high voltage storage device and to the low voltage storage device and a power split factor of the total charging current to the high voltage device and to the low voltage device, and regulate the total power to the low voltage storage device and the high voltage storage device based on the determination.

21 Claims, 11 Drawing Sheets

(56) References Cited

U.S. PATENT DOCUMENTS

| | | |
|---|---|---|
| 2010/0187031 A1 | 7/2010 | Waszak et al. |
| 2010/0211242 A1 | 8/2010 | Kelty et al. |
| 2010/0213887 A1* | 8/2010 | Louch et al. .................. 320/101 |
| 2011/0285345 A1 | 11/2011 | Kawai et al. |
| 2012/0029724 A1 | 2/2012 | Formanski et al. |
| 2012/0041621 A1* | 2/2012 | Marus et al. .................... 701/22 |
| 2012/0049792 A1 | 3/2012 | Crombez |

OTHER PUBLICATIONS

Liu et al., "Constant SOC Control of a Series Hybrid Electric Vehicle with Long Driving Range", Proceedings of the 2010 IEEE International Conference on Information and Automation, Jun. 20-23, 2010, Harbin, China, pp. 1603-1608.

* cited by examiner

CHARGING OF PORT 4 SIMULTANEOUSLY

FIG. 7

CHARGER CONFIGURATIONS — 300

| | FUNCTION | PORT 1 | PORT 2 | PORT 3 | PORT 4 |
|---|---|---|---|---|---|
| 1 | SINGLE BATTERY W/ INTEGRATED WIDE INPUT RANGE CHARGER | ENERGY BATTERY OR ULTRACAP | U/C BANK | CHARGER INPUT (DC OR RECT. AC) | N.A. |
| 2 | DUAL BATTERY W/ INTEGRATED WIDE INPUT RANGE CHARGER | ENERGY BATTERY OR ULTRACAP | POWER BATTERY | CHARGER INPUT (DC OR RECT. AC) | N.A. |
| 3 | TRIPLE BATTERY W/ INTEGRATED WIDE INPUT RANGE CHARGER | ENERGY BATTERY I OR ULTRACAP | POWER BATTERY | CHARGER INPUT (DC OR RECT. AC) | ENERGY BATTERY II OR ULTRACAP |
| 4 | BOOST BATTERY W/ LOW VOLTAGE CHARGER | ENERGY BATTERY | POWER BATTERY | POWER BATTERY | CHARGER INPUT |
| 5 | DUAL BATTERY W/ INTEGRATED WIDE INPUT RANGE CHARGER AND INTERLEAVING IN NORMAL OPERATION | ENERGY BATTERY | POWER BATTERY | CHARGER INPUT (DC OR RECT. AC) | PARALLEL CONNECTED TO PORT 1 |

METHOD AND APPARATUS FOR CHARGING MULTIPLE ENERGY STORAGE DEVICES

BACKGROUND OF THE INVENTION

Embodiments of the invention relate generally to electric drive systems including hybrid and electric vehicles and, more particularly, to charging energy storage devices of an electric vehicle using a multiport energy management system.

Hybrid electric vehicles may combine an internal combustion engine and an electric motor powered by an energy storage device, such as a traction battery, to propel the vehicle. Such a combination may increase overall fuel efficiency by enabling the combustion engine and the electric motor to each operate in respective ranges of increased efficiency. Electric motors, for example, may be efficient at accelerating from a standing start, while internal combustion engines (ICEs) may be efficient during sustained periods of constant engine operation, such as in highway driving. Having an electric motor to boost initial acceleration allows combustion engines in hybrid vehicles to be smaller and more fuel efficient.

Purely electric vehicles use stored electrical energy to power an electric motor, which propels the vehicle and may also operate auxiliary drives. Purely electric vehicles may use one or more sources of stored electrical energy. For example, a first source of stored electrical energy may be used to provide longer-lasting energy, such as a low-voltage battery (commonly referred to as an 'energy battery') while a second source of stored electrical energy may be used to provide higher-power energy for, for example, vehicle acceleration, using a high-voltage battery (commonly referred to as a 'power battery'). Known energy storage devices may also include an ultracapacitor, which tends to have fast charging and discharging capability and provides long life operation.

Plug-in electric vehicles, whether of the hybrid electric type or of the purely electric type, are typically configured to use electrical energy from an external source to recharge the energy storage devices. Such vehicles may include on-road and off-road vehicles, golf carts, neighborhood electric vehicles, forklifts, and utility trucks as examples. Known charging devices include a multiport energy storage management system (ESMS) for charging both low voltage and high voltage energy storage systems of an electric vehicle. Typically, an ESMS includes buck-boost converters which can be used in conjunction with one another in order to flexibly apply charging voltages to a variety of devices having different charging voltage requirements. An ESMS also typically includes a high voltage side and a low voltage side. In one known ESMS device having four ports, two of the ports are on a high voltage side of the device and two of the ports are on a low voltage side of the device. The high voltage side is typically used for charging from a utility grid or renewable energy source (one port on the high voltage side) and for providing charging power to a power battery (another port on the high voltage side). The low voltage side is typically used for charging low voltage devices such as energy batteries and ultracapacitors of the electric vehicle (ports on the low voltage side) and may, in some embodiments, also include adaptability to a low voltage charging source as well, in one of the low voltage ports.

A power battery, incidentally, is typically included in order to provide high power bursts for acceleration of the vehicle, as opposed to an energy battery, which is typically included in order to provide long-range cruising energy to the vehicle and it is therefore desirable to operate as a high voltage device. Thus, because of the high power requirements of the power battery, high voltage energy storage devices such as power batteries typically operate under a high voltage operation of 400 V or more, while low voltage energy storage devices such as energy batteries typically provide high energy storage and operate at a much lower nominal voltage, such as 120 V or below. Ultracapacitors can be used in either high or low voltage applications and thus can be included on either the high side or the low side of the ESMS charging device, depending on their type of use (high bursts of power vs. energy storage for cruising).

Because of the buck-boost converters in the ESMS, multiple arrangements of energy storage devices and power sources may be utilized in order to charge the energy storage devices. That is, a known ESMS is flexibly configurable in that a charging voltage may be first bucked down, and then boosted up to a desired charging voltage on the high voltage side. And, because of the bucking and subsequent boosting operations, the charging on the high side may be either above or below the charging voltage provided externally. Similarly, the charging voltage may be bucked to the lower voltage of the low voltage side as well. Further, because of the multiple buck-boost converters in an EMS, the charging voltage may be simultaneously provided to charge both the high voltage device on the high side, as well as one or more low voltage devices on the low side. That is, a single high voltage supply may be split to simultaneously provide energy to the high side and the low side devices, or to two low side devices, as examples.

Known devices that split power for charging multiple energy storage devices are typically optimized based simply on a condition of the devices that are being charged. That is, known charging or ESMS devices typically base their power split on factors such as the state-of-charge of the device(s) and/or the voltage at each respective charging port. Although such an optimization often can be adequate to provide a maximum overall rate of charging to the combination of devices being charged, such a charging scheme does not take into account additional factors such as the overall implications to the life of the devices themselves that are being charged, their temperature limits, and the like. That is, although energy storage devices may be physically capable of receiving a high rate of charge in order to minimize charging time of all devices, it may not be desirable to do so if the long-term cost to one or more of the devices is a drop in life.

In other words, the lifecycle cost and eventual need to replace storage devices such as power batteries, energy batteries, and ultracapacitors may not be worth the marginal decrease in charging time when charging is based on a state-of-charge alone. In fact, because known charging devices determine power splits and charging rates without taking into account the specifics of the devices themselves (but rather are simply based on a state-of-charge or a voltage at the charging terminals), the devices not only have a longtime risk of life, but are also at risk of catastrophic failure if charged beyond a rate than the device can handle.

It would therefore be desirable to provide an apparatus and control scheme to optimize overall recharge time for multiple energy storage devices of an EV while taking into account the life implications of the charging scheme.

BRIEF DESCRIPTION OF THE INVENTION

The invention is a method and apparatus for optimizing a total recharge time for multiple energy storage devices of an EV, accounting for life implications to the energy storage devices themselves.

According to one aspect of the invention, an electric vehicle includes a controller configured to receive sensor feedback from a high voltage storage device and from a low voltage storage device, compare the sensor feedback to operating limits of the respective high and low voltage storage device, determine, based on the comparison a total charging current to the high voltage storage device and to the low voltage storage device and a power split factor of the total charging current to the high voltage device and to the low voltage device, and regulate the total power to the low voltage storage device and the high voltage storage device based on the determination.

In accordance with another aspect of the invention, a method of managing an energy storage system for an electric vehicle includes receiving sensor feedback from a high voltage energy storage device of the electric vehicle, comparing the sensor feedback from the high voltage energy storage device to an operating limit specific to the high voltage energy storage device, receiving sensor feedback from a low voltage energy storage device of the electrical vehicle, comparing the sensor feedback from the low voltage energy storage device to an operating limit specific to the low voltage energy storage device, determining, based on the comparison from the high voltage device and from the low voltage device a total charging current to the high voltage storage device and to the low voltage storage device and a power split factor of the total charging current to the high voltage device and to the low voltage device, and regulating the total power to the low voltage storage device and the high voltage storage device based on the determination.

In accordance with yet another aspect of the invention, a computer readable storage medium coupled to an energy storage and management system (ESMS) of an electric vehicle (EV) and having stored thereon a computer program comprising instructions which when executed by a computer cause the computer to receive sensor feedback from a high voltage energy storage device of the EV and from a low voltage energy storage device of the EV, compare the sensor feedback to operating limits of the respective energy storage devices, determine, based on the comparison a total charging current to the energy storage devices and a power split factor of the total charging current between the high voltage device and the low voltage device, and regulate the total power to the energy storage devices based on the determination.

Various other features and advantages will be made apparent from the following detailed description and the drawings.

BRIEF DESCRIPTION OF THE DRAWINGS

The drawings illustrate embodiments presently contemplated for carrying out the invention.

In the drawings:

FIG. 7 is a table illustrating configurations as of the multi-port charger illustrated in FIG. 2.

DETAILED DESCRIPTION

Figure 1:
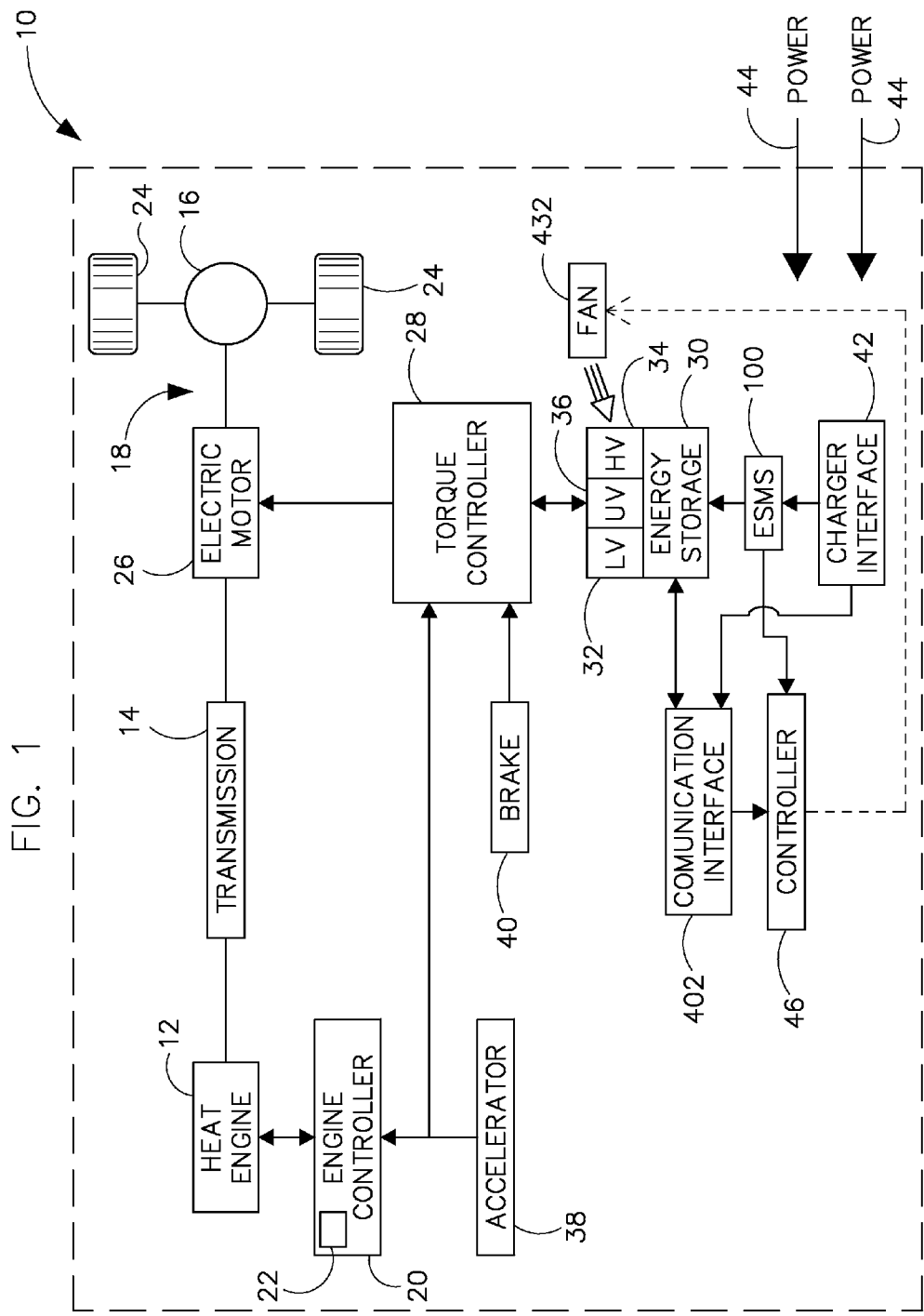
FIG. 1 is a schematic block diagram of an electric vehicle (EV) incorporating embodiments of the invention.

FIG. 1 illustrates one embodiment of a hybrid electric vehicle (HEV) or electric vehicle (EV) 10, such as an automobile, truck, bus, or off-road vehicle, for example, incorporating embodiments of the invention. In other embodiments vehicle 10 includes one of a vehicle drivetrain, an uninterrupted power supply, a mining vehicle drivetrain, a mining apparatus, a marine system, and an aviation system. Vehicle 10 includes an energy storage and management system (ESMS) 100 that is controlled by a controller or computer 46, an internal combustion or heat engine 12, a transmission 14 coupled to engine 12, a differential 16, and a drive shaft assembly 18 coupled between transmission 14 and differential 16. And, although ESMS 100 is illustrated in a plug-in hybrid electric vehicle (PHEV), it is understood that ESMS 100 is applicable to any electric vehicle, such as a HEV or EV or other power electronic drives used to operate pulsed loads, according to embodiments of the invention.

According to various embodiments, engine 12 may be an internal combustion gasoline engine, an internal combustion diesel engine, an external combustion engine, or a gas turbine engine, as examples. System 10 includes an engine controller 20 provided to control operation of engine 12. According to one embodiment, engine controller 20 includes one or more sensors 22 that are configured to sense operating conditions of engine 12. Sensors 22 may include an rpm sensor, a torque sensor, an oxygen sensor, and a temperature sensor, as examples. As such, engine controller 20 is configured to transmit or receive data from engine 12. Vehicle 10 also includes an engine speed sensor (not shown) that measures a crankshaft speed of engine 12. According to one embodiment, speed sensor may measure engine crankshaft speed from a tachometer (not shown) in pulses per second, which may be converted to a revolutions per minute (rpm) signal.

Vehicle 10 also includes at least two wheels 24 that are coupled to respective ends of differential 16. In one embodiment, vehicle 10 is configured as a rear wheel drive vehicle such that differential 16 is positioned near an aft end of vehicle 10 and is configured to drive at least one of the wheels 24. Optionally, vehicle 10 may be configured as a front-wheel drive vehicle. In one embodiment, transmission 14 is a manually operated transmission that includes a plurality of gears such that the input torque received from engine 12 is multiplied via a plurality of gear ratios and transmitted to differential 16 through drive shaft assembly 18. According to such an embodiment, vehicle 10 includes a clutch (not shown) configured to selectively connect and disconnect engine 12 and transmission 14.

Vehicle 10 also includes an electromechanical device such as an electric motor or electric motor/generator unit 26 coupled along drive shaft assembly 18 between transmission 14 and differential 16 such that torque generated by engine 12 is transmitted through transmission 14 and through electric motor or electric motor/generator unit 26 to differential 16. A speed sensor (not shown) may be included to monitor an operating speed of electric motor 26. According to one embodiment, electric motor 26 is directly coupled to transmission 14, and drive shaft assembly 18 comprises one axle or drive shaft coupled to differential 16.

A hybrid drive control system or torque controller 28 is provided to control operation of electric motor 26 and is coupled to motor/generator unit 26. An energy storage system 30 is coupled to torque controller 28 and is controllable by ESMS 100. Energy storage system 30 comprises a low voltage energy storage or energy battery 32, a high voltage energy storage or power battery 34, and an ultracapacitor 36, as examples. However, although a low voltage energy storage 32, a high voltage energy storage 34, and an ultracapacitor 36 are illustrated, it is to be understood that energy storage system 30 may include a plurality of energy storage units as understood in the art such as sodium metal halide batteries, sodium nickel chloride batteries, sodium sulfur batteries, nickel metal hydride batteries, lithium ion batteries, lithium polymer batteries, nickel cadmium batteries, a plurality of ultracapacitor cells, a combination of ultracapacitors and batteries, or a fuel cell, as examples. An accelerator pedal 38 and brake pedal 40 are also included in vehicle 10. Accelerator pedal 38 is configured to send throttle command signals or accelerator pedal signals to engine controller 20 and torque control 28.

System 10 includes a charger interface 42 coupled to energy storage units 32-36 of energy storage system 30 via ESMS 100, according to embodiments of the invention. Charger interface 42 may be coupled to multiple energy storage systems 32-36, as illustrated and charger interface 42 may be coupled to one or multiple power input lines 44, two of which are illustrated, according to embodiments of the invention. ESMS 100 is configured to selectively engage and disengage DC electrical devices or buck-boost modules as will be discussed. In one embodiment and as will be illustrated, charger interface 42 is connectable to a high voltage port of ESMS 100. Typically, charger interface 42 includes an interface to the one or more input lines 44 such that power from input lines is connectable to a charging port of ESMS 100.

Although charger interface 42 is illustrated as being coupled to energy storage systems 32-36 via ESMS 100, and charger interface 42 is illustrated as coupled to one or multiple power input lines 44, it is to be understood that embodiments of the invention are not to be so limited. Instead, it is to be understood that charger interface 42 may be coupled to multiple and varying types of energy storage systems and power inputs. Further, there may be multiple charger interfaces 42 or ESMS units 100 per vehicle, or that there may be power systems applied to each wheel 24 of vehicle 10, each having a charger interface 42 coupled thereto.

In operation, it is understood in the art that energy may be provided to drive shaft assembly 18 from internal combustion or heat engine 12 via transmission 14, and energy may be provided to drive shaft assembly 18 via drive control system 28 having energy drawn from energy storage system 30 that may include energy systems 32-36. Thus, as understood in the art, energy may be drawn for vehicle 10 boost or acceleration from, for instance a high voltage storage device 34 that may include a battery, as an example, or from ultracapacitor 36. During cruising (i.e., generally non-accelerating operation), energy may be drawn for vehicle 10 via a low voltage storage device such as low voltage energy storage 32.

And, during operation, energy may be drawn from internal combustion or heat engine 12 in order to provide energy to energy storage 30, or provide power to drive shaft assembly 18 as understood in the art. Further, some systems include a regenerative operation where energy may be recovered from a braking operation and used to re-charge energy storage 30. In addition, some systems may not provide regenerative energy recovery from braking and some systems may not provide a heat engine such as internal combustion or heat engine 12. Nevertheless and despite the ability of some systems to re-charge energy storage 30, energy storage 30 periodically requires re-charging from an external source such as a 115 V household supply or a 230 V 3-phase source, as examples. The requirement to re-charge energy storage 30 is particularly acute in a plug-in hybrid electric vehicle (PHEV) having no heat engine to provide power and an extended range of driving operation.

Thus, embodiments of the invention are flexible and configurable having a plurality of energy ports, and may be coupled to multiple power sources and source types in order to charge one or multiple energy storage types. Further, embodiments of the invention allow efficient and balanced charging of multiple energy systems 32-36 of energy storage unit 30, the multiple energy systems having varying levels of depletion.

To meet the demands of modern PHEVs and EVs, the infrastructure should provide typically 7 kW to achieve a state-of-charge (SOC) gain of 80% (assuming a 25 kWh battery) in a charging time of 2 or 3 hours (home charging). For a more aggressive short stop fast charging scenario (e.g., a "gas station") significant higher power levels may be required to achieve a desired 80% SOC in 10 minutes. The vehicle interface needs to be designed according to existing standards. A pilot signal determines by its duty cycle the maximum allowable power. Besides a high degree of integration the proposed system provides also single and or three phase AC input, high efficiency, low harmonics, nearly unity input power factor, low cost, low weight and safety interlocking of the equipment. The power factor correction (PFC) requirement may be driven by IEC/ISO/IEEE line harmonic current regulations, as known in the art.

This invention is applicable to conventional electric vehicles (EVs) as well as grid-charged hybrid electric vehicles (PHEVs). Grid-charged HEVs provide the option to drive the vehicle for a certain number of miles (i.e., PHEV20, PHEV40, PHEV60). Traditionally, the goal for PHEVs is to provide a high all-electric-range (AER) capability to lower operating cost and be able to optimize the operating strategy. In terms of the buck-boost stages, the charger front-end and interface, it generally makes little difference if it is designed for an EV or PHEV application. The role of the DC/DC converter is an efficient energy transfer between two or more energy sources, reliable for continuous and peak power demands. The integration of the charger unit is the next step towards a higher power density design with fewer components and therefore higher reliability. As such, embodiments of the invention are applicable to multiple electric vehicles, including all-electric and hybrid electric vehicles, as examples, designated generally and broadly as "EV"s. Such EVs may include but are not limited to road vehicles, golf carts, trains, and the like, capable of having power systems that include an electric component for causing motion of the vehicle.

In conventional implementations many separate units coexist, to include generally a separate charger, battery management and control unit that are interconnected. In an automotive environment with advanced batteries, communications between the charger and battery is an important consideration. In such environments seamless integration with batteries from different battery vendors is also an important consideration. The energy management system with integrated charger is advantageous in that aspect that there is less integration effort required and fewer components improve reliability.

Figure 2:
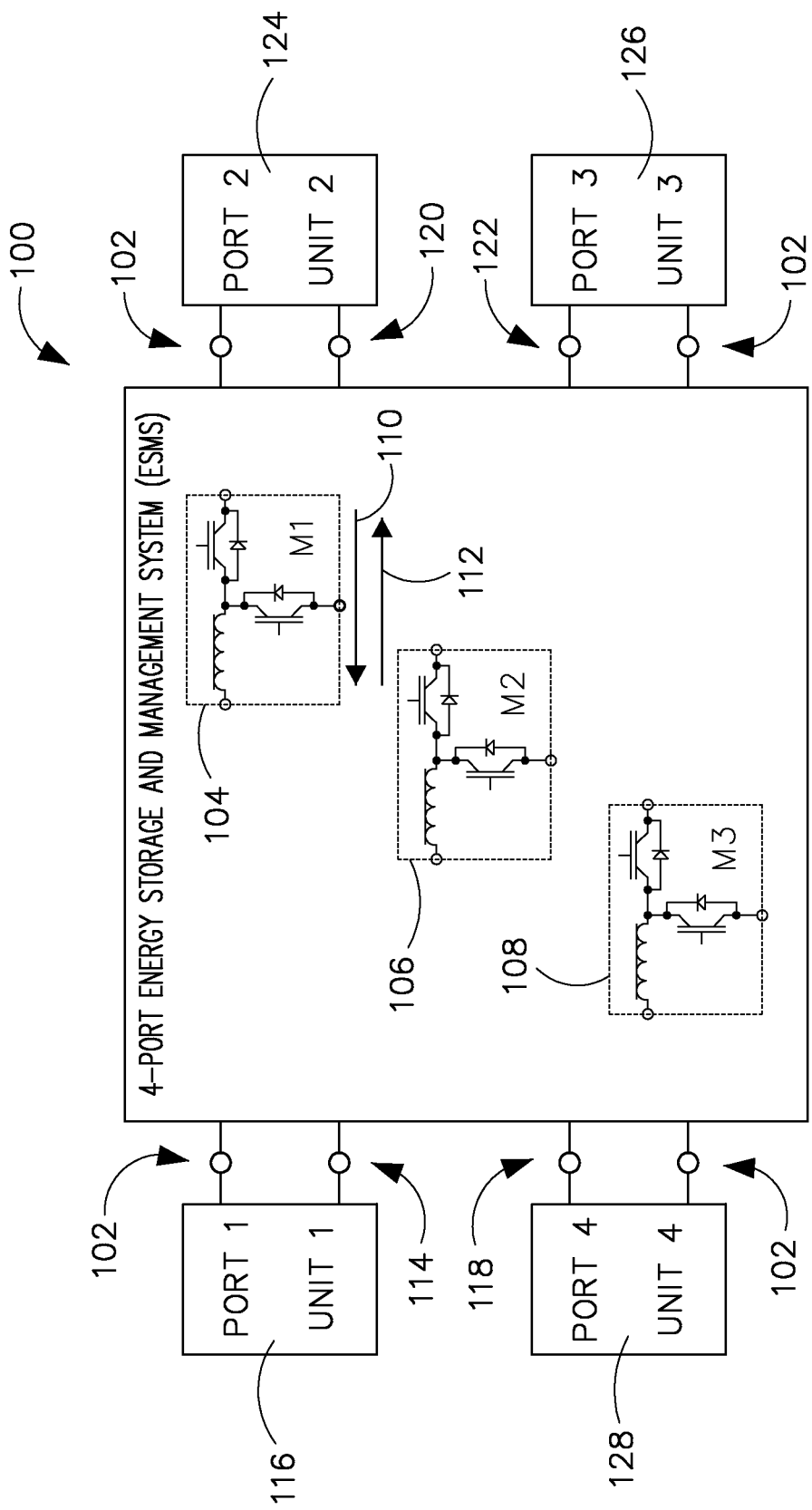
FIG. 2 is a schematic diagram of a configurable multi-port charger architecture according to an embodiment of the invention.

Referring now to FIG. 2, configurable multi-port integrated charger architecture, energy storage and management system (ESMS) 100, is generically illustrated having four energy ports 102 and three DC electrical conversion devices or buck-boost converters respectively as modules 1, 2, and 3 (104, 106, 108). As known in the art, buck-boost converters 104-108 may be configured to operate in either a buck-mode by flowing electrical energy therethrough in a first direction 110 (illustrated with respect to buck-boost converter 104, but equally applicable to converters 106 and 108), or a boost mode by flowing electrical energy in a second direction 112 (illustrated again with respect to buck-boost converter 104, but equally applicable to converters 106 and 108). As illustrated, energy ports 102 comprise a first energy port P1 114 configurable to have a first unit 116 attached or electrically coupled thereto. Similarly, energy ports 102 comprise fourth, second, and third energy ports P2 118, P3 120, and P4 122 that are configurable to have respective second unit 124, third unit 126, and fourth unit 128 attached or electrically coupled thereto.

According to the invention the charger is part of the vehicle design and mounted on-board. The integrated on-board charger is capable of continuously adjusting input currents to energy ports 114 and 118-120 as a result of, for instance, varying SOC of devices connected thereto for charging.

As will be illustrated, ESMS 100 of FIG. 2 may be configured to charge up to three energy sources (to include low voltage energy batteries, high voltage power batteries, ultracapacitors, as examples) at the same time or simultaneously. ESMS 100 may have modules therein configured to be interleaved in order to lower ripple current. ESMS 100 also is capable of having multiple charging profiles as a function of conditions that include SOC and temperature, as examples, for different battery technologies and storage device types. ESMS 100 includes a centralized energy flow control that is centrally controlled by controller 46 of FIG. 1, and ESMS 100 is capable of managing a wide range of input and output voltages.

ESMS 100 of FIGS. 1 and 2 is configurable in multiple configurations. Each configuration of ESMS 100 may be selectable by contactors. Energy flow is controlled by ESMS control algorithms, implemented in controller 46 of hybrid vehicle 10, which can sense a presence of both energy storage devices and charging devices connected to ports 102 and adjust a flow of direction of energy, accordingly. For instance, the control algorithms may determine a voltage of each port to which an energy storage device or an electrical charging system (DC or rectified AC, as examples) is coupled, and operate ESMS 100 accordingly and based on the determined voltages, based on a measured frequency, or both (as examples). And, a benefit for including a rectifier is that even if DC is connected having the wrong polarity, the rectifier provides protection, even if a single phase rectifier is used or if a DC input is used to two of the 3-phase inputs for a 3-phase rectifier.

The wide input voltage integrated charger allows independent and simultaneous charging of two or more batteries of any SOC level respectively from any input voltage level within the voltage limit of ESMS components. The input voltage can range from typical single phase voltages (110V/120V), to 208V/240V and up to 400V or even higher (level 1 ... 4). The highest currently specified voltage is 400V for rapid DC charging, however with proper selection of ESMS components, up to 480V single or 3-phase AC or even 600 V DC can be utilized to provide higher level of charging for shorter time duration (i.e., fast charging). An energy battery is either connected to first energy port 114 or fourth energy port 118 and has typically lower nominal voltages than the power battery on second energy port 120. Short time energy storage devices, such as ultracapacitors, may be included on first energy port 114.

Figure 3:
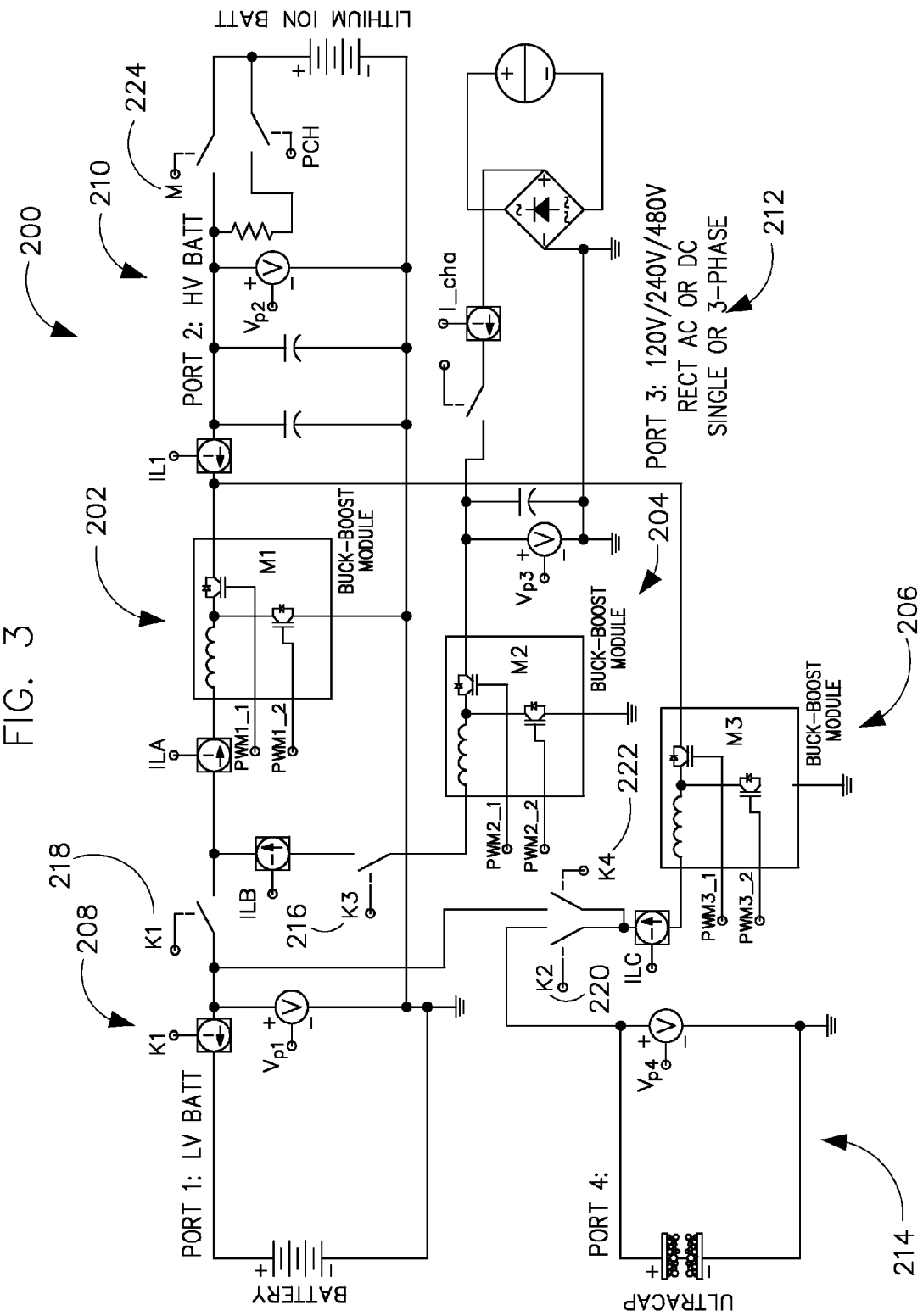
FIG. 3 illustrates an electrical schematic of a multi-port charger according to an embodiment of the invention.

Generically illustrated ESMS 100 of FIG. 2 may be configured by selective use of switches in order to support a number of charging arrangements. FIG. 3 illustrates a detailed circuit diagram of a multi-port ESMS according to an embodiment of the invention. For simplicity, control electronic components are omitted. Thus, ESMS 200 (similar to ESMS 100 of FIGS. 1 and 2) illustrates a first buck-boost module 202, a second buck-boost module 204, and a third buck-boost module 206. ESMS 200 also illustrates port P1 208 having a relatively low voltage battery coupled thereto, port P2 210 having a relatively high voltage unit coupled thereto, port P3 212 having a rectified AC or DC voltage coupled thereto, and port P4 214 having a relatively low voltage ultracapacitor coupled thereto. Thus, in the example illustrated, energy storage devices and an energy charger are coupled to ESMS 200 in order to illustrate operation according to one configuration. However, as discussed, ESMS 200 may be configured in numerous arrangements in order to accommodate multiple charger/energy storage arrangements. As such, ESMS 200 includes contactors K3 216, K1 218, K2 220, K4 222, and M 224 which may be selectively engaged or disengaged in order to accomplish configurations for charging, according to the illustrations above.

Each of the three buck-boost modules M1 202, M2 204, M3 206 includes an IGBT leg (upper and lower switch) and an inductor. The high voltage DC bus may be buffered by a number of power capacitors. Each buck-boost converter stage output is equipped with a current sensor, which measures an inductor current. Voltage limits shown at port P3 212 are originated by typical single-phase AC outlet voltages in both the US and Europe. However, in applications requiring higher levels of charge power, port P3 can be coupled via charger interface 42 (FIG. 1) to 208V, 240V, or 480V 3-phase, or either 400 V DC or up to 600 V DC.

ESMS 200 uses contactors as main bus and individual module switches. A pre-charge circuit is realized using two power resistors (e.g., 120 ohm, 100 W, RH-50) and a contactor or FET. An additional contactor (K4 222 in FIG. 3) serves in two cases. One is under a certain SOC condition of a battery at port P1 208, and the second if interleaving of module 1 202 and module 3 206 is enabled. FIG. 3 illustrates voltage and current sense points of ESMS 200 having an integrated charger.

Charging may be using a single battery or a dual battery. Charging in a dual battery configuration as shown here allows charging from a wide input voltage range of batteries with an arbitrary SOC level for both batteries. The internal architecture of the multi-port integrated charger with its software features only allows this. Upon power-up, ESMS 200 control recovers the type of energy storage units that are being used, their energy ratings and limits for charging current and power. From the communication interface to the electric vehicle supply equipment (EVSE) the ESMS sets limits for input current and eventually the type of power source (AC or DC).

Figure 4:
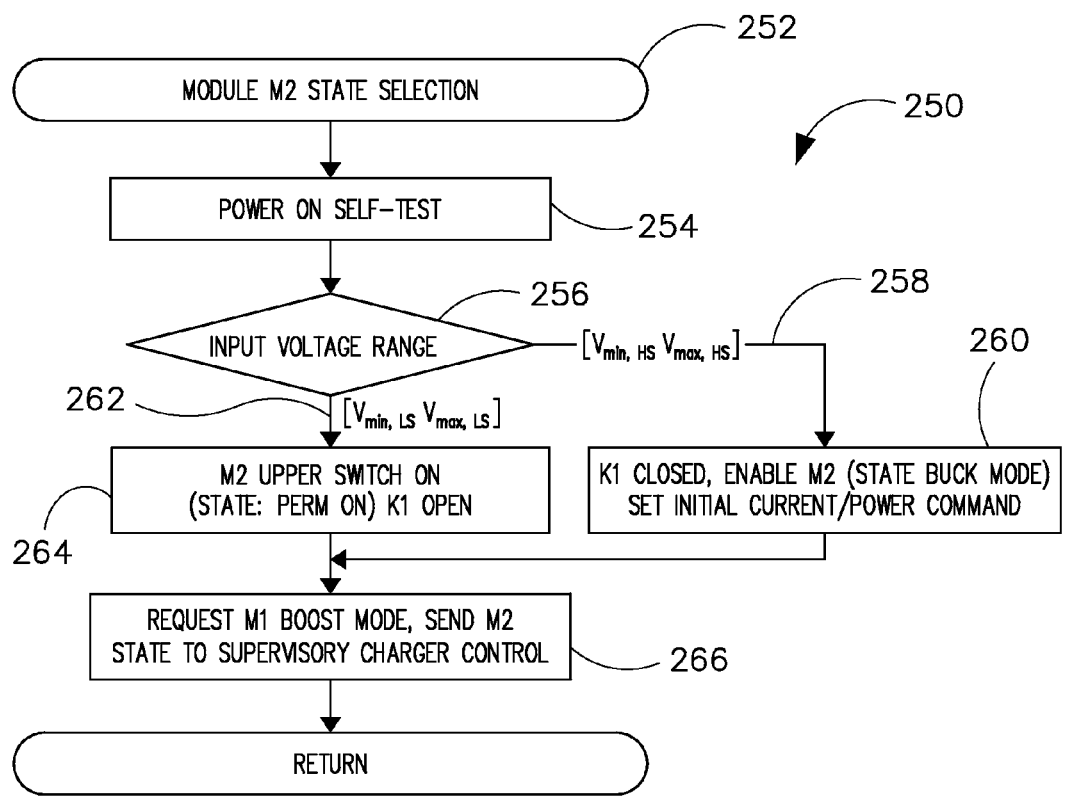
FIG. 4 illustrates a control scheme, as an example, specific to module M2 of FIG. 2.

Each buck-boost module runs an independent state machine. The states are disabled/standby, buck mode enabled, boost mode enabled or enabled permanent conducting upper switch (specific to module 2 204 as illustrated in FIG. 4 as sequence 250). Module state selection occurs at step 252 and power on self-test occurs at step 254. Input voltage range is determined at step 256 and if $V_{min}$ and $V_{max}$ are on the high side 258, then switch K1 218 is closed and module M2 204 is enabled 260, causing module M2 204 to operate in buck mode. If $V_{min}$ and $V_{max}$ are on the low side 262, then switch K1 218 is opened and module M2 upper switch is on, causing module M2 204 to be permanently on 264. At step 266, module M1 202 is requested and the state of module M2 204 (i.e., buck mode at step 202 or permanently on at step 264) is returned at step 268 for further operation. Part of this sequence is also to force the contactors into the right state. For charging generally contactor K3 216 is closed to allow the use of modules M1 202 and M2 204 for controlled charging of the port P2 210 energy storage device. In this sequence of the charging control the software distinguishes several cases that might apply and selects the appropriate state of each of the three buck-boost modules 202-206.

In the start-up sequence and before any contactor is forced to the ON state and before the modules and switching of the IGBTs are enabled, ESMS 200 control acquires the voltage levels of all used energy sources and determines the charger input voltage. This is done in order to avoid any possible uncontrolled current when for example the voltage on the low side of the buck-boost module is higher than the voltage on the high side. This can be the case for example when the power battery on the high side is deeply discharged and the energy storage devices on port P1 208 and/or port P4 214 still have a significant amount of energy stored. This is a scenario that is typically avoided by normal operation energy management of the vehicle, but it might be possible if the high side energy storage device is replaced and not charged up prior to replacement, or the normal operation energy management was not active for long time for some reason. The integrated charger control can handle even very extreme and unusual voltage levels at all four ports 208-214 and allows controlled energy management to bring the system back to normal operation.

Figure 5:
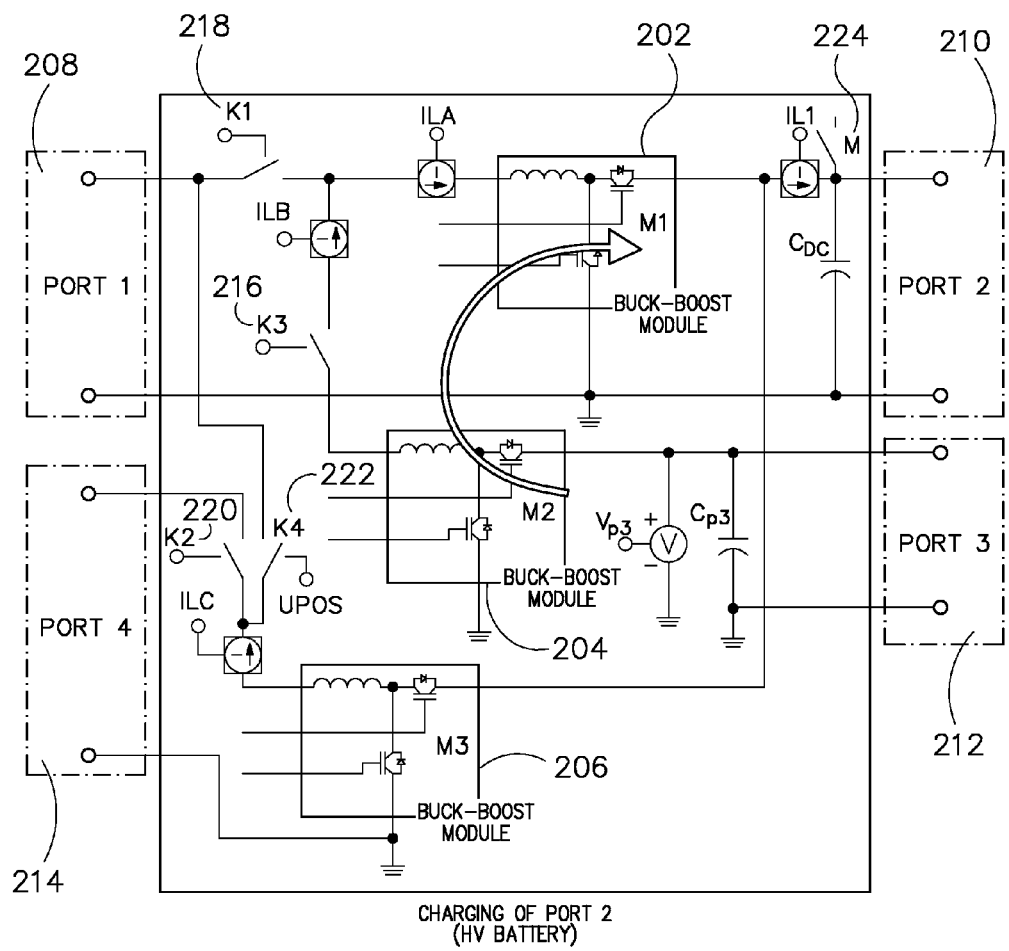
FIGS. 5 and 6 illustrate flow of a charging current in a multi-port charger in exemplary modes of operation.

In one mode of operation, referring to FIG. 5, a charging current is established into the high side energy storage device at port P2 210. This is referred to as the single HV battery charging mode. Module M1 202 operates in boost mode, contactors K3 216 and M 224 are closed, while contactors K1 218, K2 220 and K4 222 are open. Depending on the charger input voltage, module M2 204 is in buck mode ($V_{P3}>V_{P2}$) or the upper switch is permanently conducting ($V_{P3}<V_{P2}$). The charging current is controlled through module M1 202. Depending on the charging strategy, the SOC or the voltage level of the device at port P2 210 the control determines the charging current and the time of operation in this mode.

As an extension to the mode described before, referring to FIG. 6, the charger control enables charging of a second energy storage device on either port P1 208 or port P4 214. This may be referred to as a dual battery charging mode. In this mode the control ensures that a controlled current flow is possible before closing the contactors and enabling module M3 206. If the voltage levels are in permissible range either contactor K2 220 or K4 222 are forced into ON state, module M3 206 is set into buck mode and determines the charging current and the time of operation in this mode. An initial power split factor is applied while currents and voltages are constantly monitored to calculate each individual SOC. By using a commercial off the shelf (COTS) battery pack, the standardized communication interface of the integrated charger ESMS also allows to receive voltage and SOC from the system. The integrated charger ESMS executes the desired charging strategy, which depends on battery technology, thermal constraints, etc.

SOC of attached energy storage devices is estimated to determine a power split from the wide voltage input to the energy storage devices. Individual device SOC is constantly monitored to determine and optimize the power split factor. This task is responsible for handling extreme SOC levels appropriately. For example, a fully discharged high side battery on port P2 210 might operate at voltages that are below the battery on port P1 208. In this case charging up the high side battery on port P2 210 is required before a charge power split can be performed.

Figure 6:
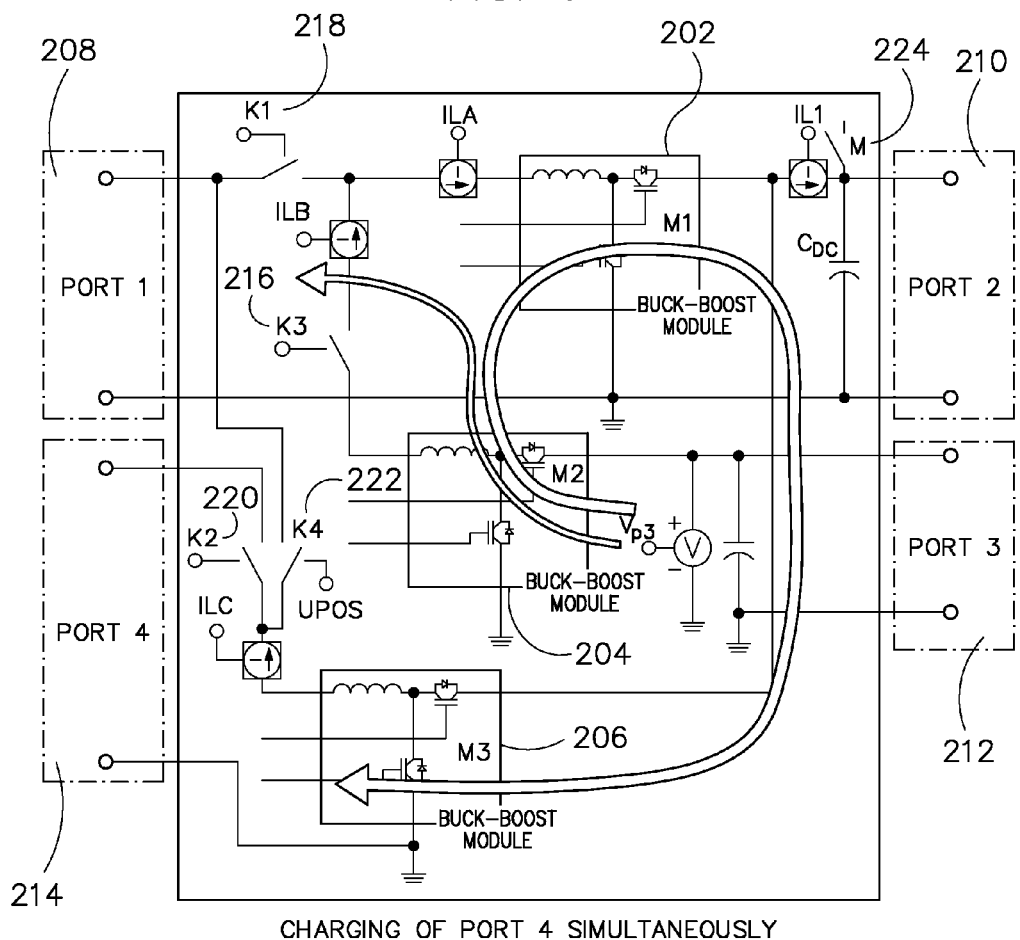

Referring to FIGS. 5 and 6, energy flow for two configurations of charging is illustrated. Referring first to FIG. 5, energy is to flow from a charger (not illustrated) positioned on port 3 212, to module 2 210, and to module 1 208 operating in boost mode. As such, a DC source may be boosted to a high-voltage output on port 2 210, by ensuring K1 218 and K2 220 are open.

In the other example illustrated in FIG. 6, port 1 208 and port 4 214 may be charged simultaneously from a DC source (not shown) coupled to port 3 212. Two cases may be considered regarding FIG. 6, as examples.

Case 1: Input voltage at port 3 212 is higher than battery voltage at port 1 208. In this case module 2 204 operates in buck mode and the current ILB in LU is regulated. Contactors K3 216 and K1 218 are closed, while M 224, K2 220 and K4 222 (UPOS) are open.

Case 2: Input voltage at port 3 212 is lower than battery voltage at port 1 208. In this case contactors K3 216, M 224 and K4 222 (UPOS) are closed, while K1 218 and K2 220 are open. Module 2 204 is inactive (M2 is permanently on), module 1 202 operates in boost mode to boost the low input voltage up to some higher level. Module 3 206 bucks this voltage back to the set voltage of the energy battery at port 1 208. The current ILC in LW is controlled in a closed loop fashion.

Thus, FIGS. 5 and 6 illustrate different charging scenarios that may be implemented using ESMS 200 of FIG. 3, illustrating as well the direction of current flow corresponding to the charging arrangement illustrated. However and as stated, ESMS 200 may be used in multiple configurations. Different energy storage types and chargers may be connected to ESMS 200 according to embodiments of the invention, as illustrated in FIG. 7 as a table 300. That is, exemplary charging scenarios 1-5 302 include functions 304 and the various charger and energy storage devices positioned at ports 1-4. It is contemplated that, although five charging scenarios 302 are illustrated, the invention is not so limited and any charger/storage arrangement is possible.

Figure 8:
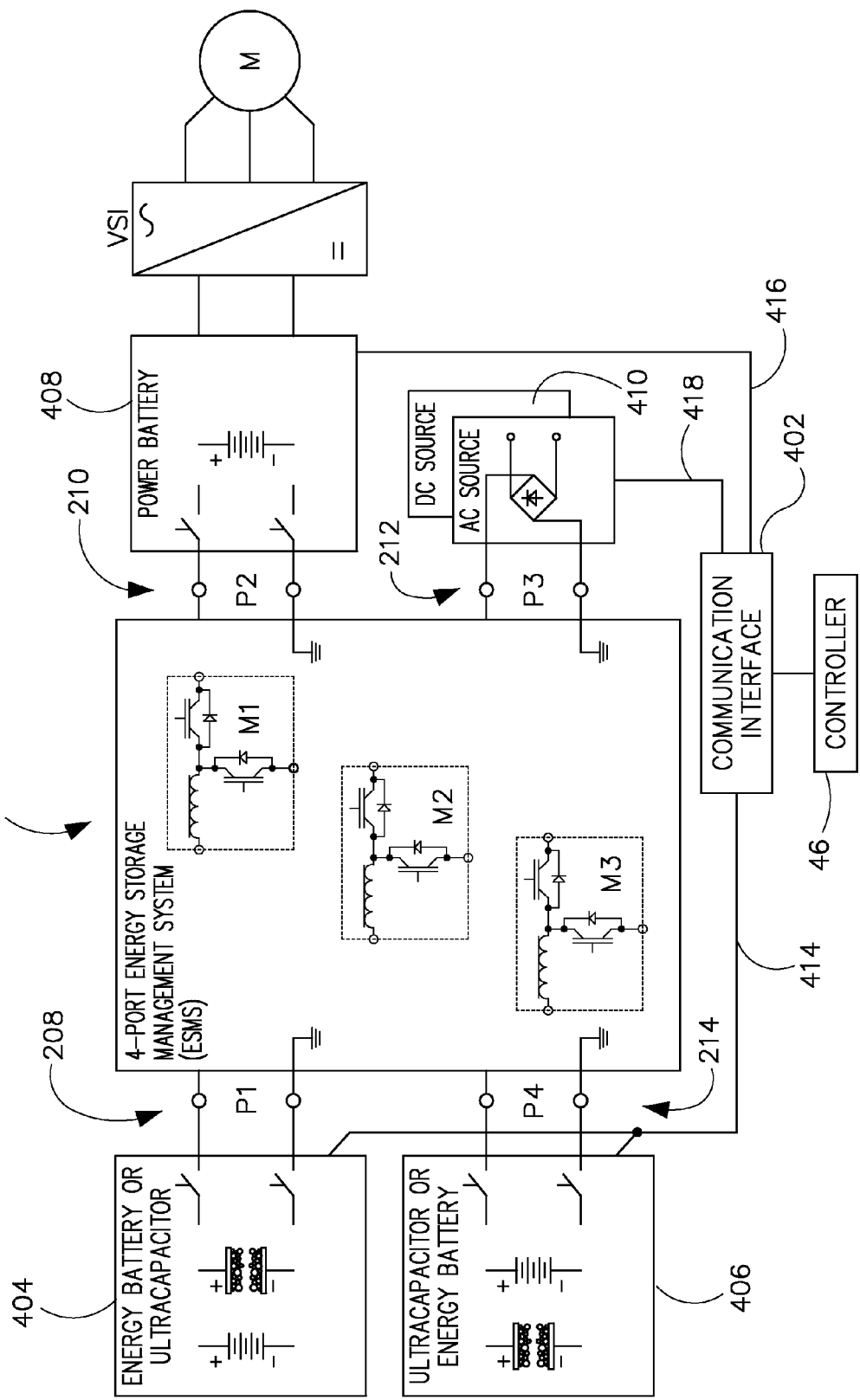
FIG. 8 is a block diagram illustrating a recharging scenario and use of a communication interface, according to an embodiment of the invention.

Referring now to FIG. 8, an exemplary charging arrangement is illustrated that corresponds generally to charging scenario 3 of Table 300 of FIG. 7. The configuration illustrated in FIG. 8, configuration 400, is illustrated having ESMS 200 with ports P1 208, P2 210, P3 212, and P4 214. Configuration 400 is illustrated in order to show communication interface 402 and its operation. An energy battery or ultracapacitor 404 is coupled to port P1 208, an ultracapacitor or energy battery 406 is coupled to port P4 214, and a power battery 408 is coupled to port P2 210. An AC or DC source 410 is coupled to port P3 212 and, as stated above, may be coupled through a charger interface 42 of FIG. 1. Communication interface 402 is coupled to storage devices 404-408, as well as source 410, according to embodiments of the invention. Communication interface 402 is also illustrated in FIG. 1, in communication with energy storage 30 (having devices 30-36), controller 46, and charger interface 42.

Referring still to FIG. 8, communication interface 402 includes multiple communication lines 412, 414, 416, and 418 coupled thereto which enable sensor readings to be carried from respective devices 404-410. That is, communication lines 412-418 are coupled to their respective device in order to obtain temperature limits and current limits, as examples, that pertain to devices 404-410, as well as provide realtime feedback regarding temperature, current, and voltage, of each respective device 404-410. Additionally, device parameters such as current state-of-charge and voltage measurements may be obtained as well from each device 404-410.

Figure 9:
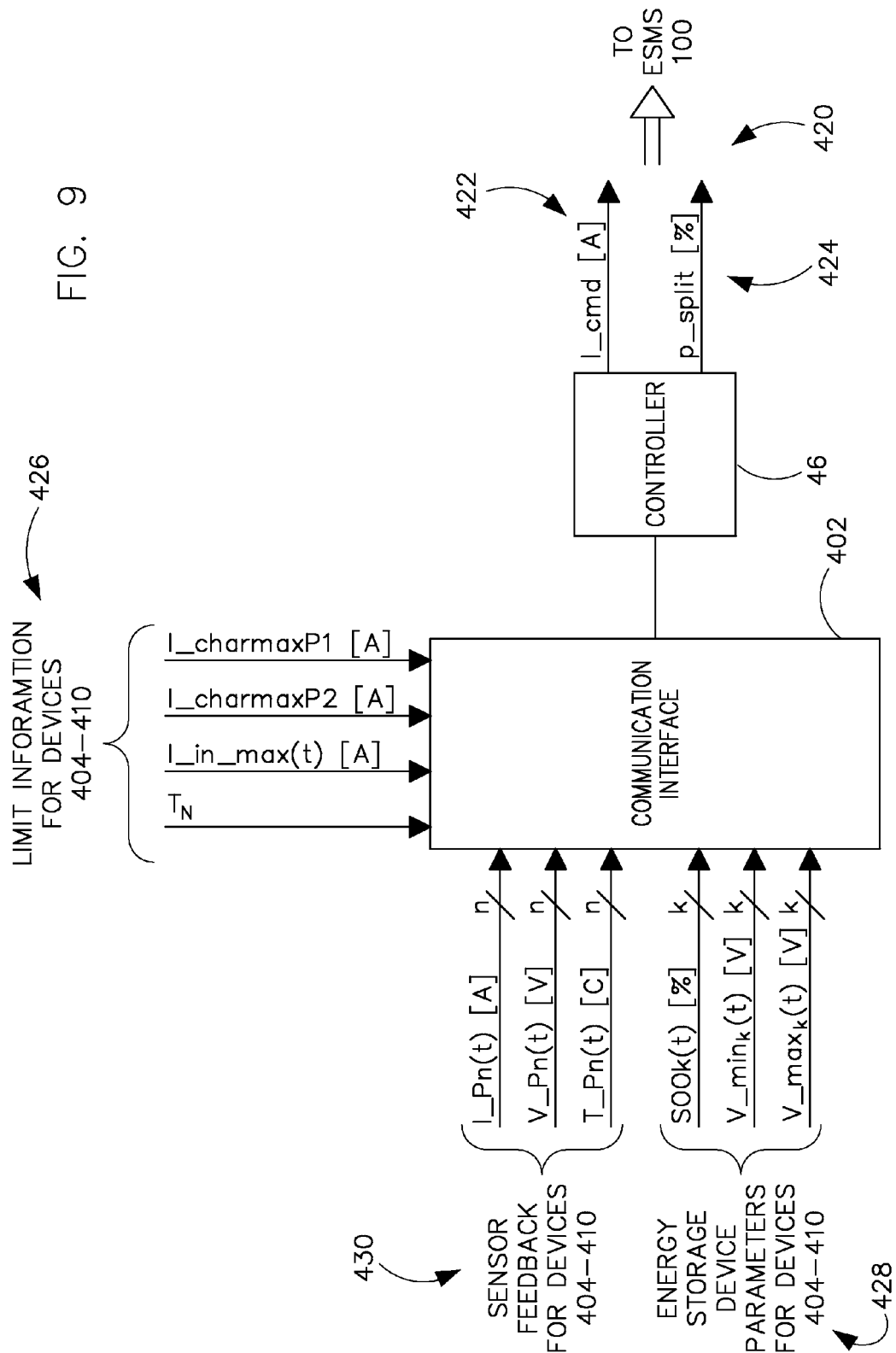
FIG. 9 illustrates control variables and parameters with respect to a communication interface, according to an embodiment of the invention.

Thus, referring to FIG. 9, communication interface 402 is configured to receive multiple inputs from various sources in order to optimize charging operation, according to the invention. Communication interface 402 is coupled to controller 46, which is configured to output two parameters 420, according to the invention. Two parameters 420 include an overall charging current 422 and a power split 424. That is, based on information received from, and regarding the current state of devices 404-410, overall charging current 422 and power split 424 are determined and fed to ESMS 100 in order to optimize regarding of devices 404, 406, and 408, according to embodiments of the invention.

As seen in FIG. 9, communication interface 402 receives a number of types of information pertaining to devices 404-410. For instance, communication interface 402 receives limit information 426 that includes but is not limited to temperature limits of each of the N devices (i.e., devices 404-410), maximum current pertaining to each, or maximum rate of current change, as examples. Communication interface 402 also receives energy storage device parameters 428 for each of the N devices 404-410 as well. Parameters 428 include but are not limited to a state-of-charge (SOC), a minimum voltage, and a maximum voltage, as examples. Communication interface 402 also receives sensor feedback 430 from each of the N devices 404-410, which includes but is not limited to current in each device, voltage across each device, and temperature of each device.

Thus, communication interface 402 receives limit information 426, device parameter information 428, and realtime sensor information 430 which are processed and fed to controller 46 such that overall charging current 422 and power split 424 may be determined therein and fed to ESMS 100. ESMS 100 thereby and in turn controls modules M1-M3 therein accordingly. According to one embodiment of the invention, power split 424 is split between high and low voltage sides of ESMS 100 (high voltage side includes ports P2 210 and P3 212, while the low voltage side includes port P1 208 and P4 214). That is, referring to FIG. 8 for instance, power split 424 includes a percentage of total power that is directed toward power battery 408, and the remaining percentage of total power that goes to both storage device 404 and storage device 406. Thus, in an embodiment where only one low voltage storage device is coupled to the low voltage side of ESMS 200, and one high voltage storage device is coupled to the high voltage side of ESMS 200, then power is split fractionally to the low and the high voltage storage devices, and the total current to both devices is controlled, accordingly.

According to the invention, power regulation to the low and high voltage sides is continuous based on a continuous monitoring of the sensors. According to one embodiment, if one of the low or high voltage storage devices is fully depleted, then when beginning to charge the low and high voltage storage devices, the power split is 100% to the fully depleted device, after which monitoring as described dictates a continuous revision of total power and power split, as described.

According to the invention, controller 46 may apply thermal balancing by controlling operation of a fan based on feedback, temperature limits, etc. . . . . . Thus, referring back to FIG. 1, a fan 432 may be positioned to blow air over one or all of the energy storage devices (32-36) shown therein, which likewise correspond to the energy storage devices 404-408 of FIG. 8 or energy storage devices 208, 214, and 210 of FIGS. 5 and 6. Temperature information is usually available from the different energy storage units that can be used to provide a coarse thermally balanced charging that is achieved by splitting the power flow symmetrically over all modules. In a scenario of at least one Li-Ion battery pack in the system, especially if passive balancing is applied, temperature information is usually available to be used by the charging control. A thermal model can be used if the sensor distribution is coarse or the battery technology allows easy prediction of the temperature distribution inside the pack. Thus, for thermal balancing the control objective is to balance battery pack temperature distribution and, in addition to controlling total current 422 at port P3, and power split 424 between units, fan operation can be controlled as well using fan speed control, thermal modeling, and the like, in order to optimize thermal performance of the energy storage devices.

According to the invention, power may be maximized to the high voltage side (i.e., the power battery). The objective of this charging strategy is to bring the DC link voltage up rapidly and utilize fully the available power to charge the power battery. This might be desired if there are shorter discharge and charging cycles desired or possible. Therefore a more frequent recharging is performed by the high performance power battery, both the DC link voltage is kept relatively high and boosting energy from the second battery is avoided to improve efficiency. Thus, in this scenario the control objective is to maximize a state-of-charge at port P2 on the high voltage side and in the power battery in the shortest amount of time, in addition to controlling total current 422 at port P3, and power split 424 between units.

According to the invention, depending on the dual battery configuration (e.g., power battery and energy battery of similar capacity), it may be desired to keep the energy balanced within the dual battery configuration during charging. The state-of-charge levels of both batteries that are available to the integrated charger energy management are controlled to be on equal levels within an acceptable error. Thus, in this scenario the control objective is to maintain the state of charge (SOC) at both ports P1 and P2 at a similar level, and further to rise their respective SOC with a similar slope, by controlling total current 422 at port P3, and power split 424 between units.

According to the invention, by using Li-Ion battery technology, where cell groups need to be individually balanced, due to aging temperature effects or discharge rates, the individual cell groups might be imbalanced significantly. An optimal pack balancing strategy includes keeping minimum and maximum cell voltages within a limit. A subsequent control uses available energy to charge a lesser constrained battery of a different technology. However, an imbalanced Li-Ion battery pack usually requires long charging times since active or passive balancing is time consuming while the charging current has to be reduced significantly and over a long period. Thus, in this scenario the control objective includes minimizing a voltage gap between maximum and minimum cell voltages of both batteries, such as at ports P1 and P2, by controlling total current 422 at port P3, and power split 424 between units.

According to the invention, minimizing losses and therefore maximizing efficiency of the overall system is a goal, and many parameters need to be considered during the design of the DC-to-DC converter and the boost inductors. Once the multi-port buck-boost converter design is finalized, loss optimized control can be achieved for example through operating the converter predominately in a range of high efficiency. This is in many cases around rated power rather at light load, where efficiency usually drops. Also if a small discharge cycle can be assumed, for example in a <40 mile daily commute mode is selected, the use of the boost can be limited to the absolute necessary during driving operation. The capability of the battery providing power is based on the history of charge and discharge cycles. A high C-rate operation strategy has an impact on the internal resistance and causes faster aging. With that an efficiency optimized operation strategy is linked to a lifetime optimized strategy to some degree. Thus, in this scenario the control objective is to operate at maximum of the efficiency curves, obtained by controlling total current 422 at port P3, and power split 424 between units.

Thus, numerous control schemes and optimization scenarios are included, which may be optimized according to embodiments of the invention. Examples given include but are not limited to thermal balancing, maximizing power to the high voltage side (power battery), balancing state-of-charge levels, optimal pack balancing, and loss minimized control.

Figure 10:
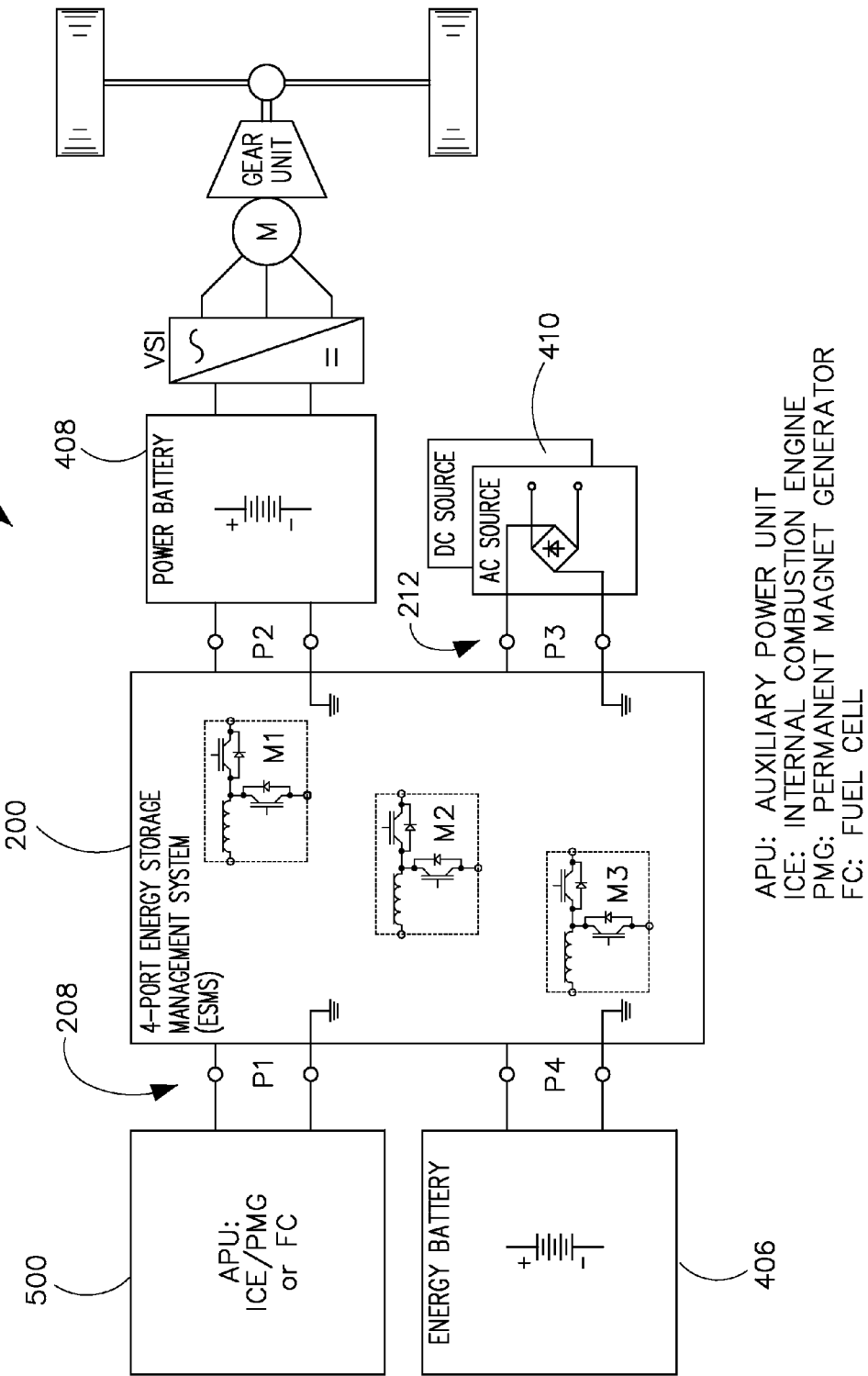
FIG. 10 is a schematic block diagram of an electric vehicle (EV) having an auxiliary power unit (APU) incorporating embodiments of the invention.

Source 410 of FIG. 8 includes an AC or a DC source that is coupleable to ESMS 200 during periods when vehicle 10 is parked (such as at a charging station, at home in a garage, or during work, as examples). However, the invention is not necessarily limited to charging when vehicle 10 is stationary. That is, according to the invention, an auxiliary power unit (APU) may be included that is positioned on vehicle 10 that enables energy storage system re-charge as well as providing power for vehicle operation. Referring to FIG. 10, vehicle 10 in this embodiment includes an APU 500 in lieu of the energy battery 404 of FIG. 8. Thus, consistent with vehicle 10 of FIG. 1, vehicle 10 may include in addition to heat engine 12, an APU that provides auxiliary power to electric motor 26 via ESMS 200 (also labeled as ESMS 100 in FIG. 1). APU 500 may include an internal combustion engine (ICE), a permanent magnet generator (PMG), or a fuel cell (FC), as examples. That is, in lieu of a low voltage/high energy, energy storage system such as LV supply 32 of FIG. 1, APU may provide electrical power to system 10 via ESMS 200 to provide power for vehicle cruising, or to provide power for re-charge of other energy storage units 406, 408. For instance, in one mode of operation, heat engine 12 may provide power to electric motor 26 to provide power for vehicle operation, while at the same time, APU 500 can provide re-charging energy to energy storage units 406, 408. In such fashion, energy use can be optimized by selectively providing power from heat engine 12 and re-charging other storage units for peak efficiency. The APU 500 provides additional flexibility of operation and enables independent or simultaneous charging of both batteries 406, 408, and extends the integrated charging control. Charging is no longer limited to stationary charging.

Figure 11:
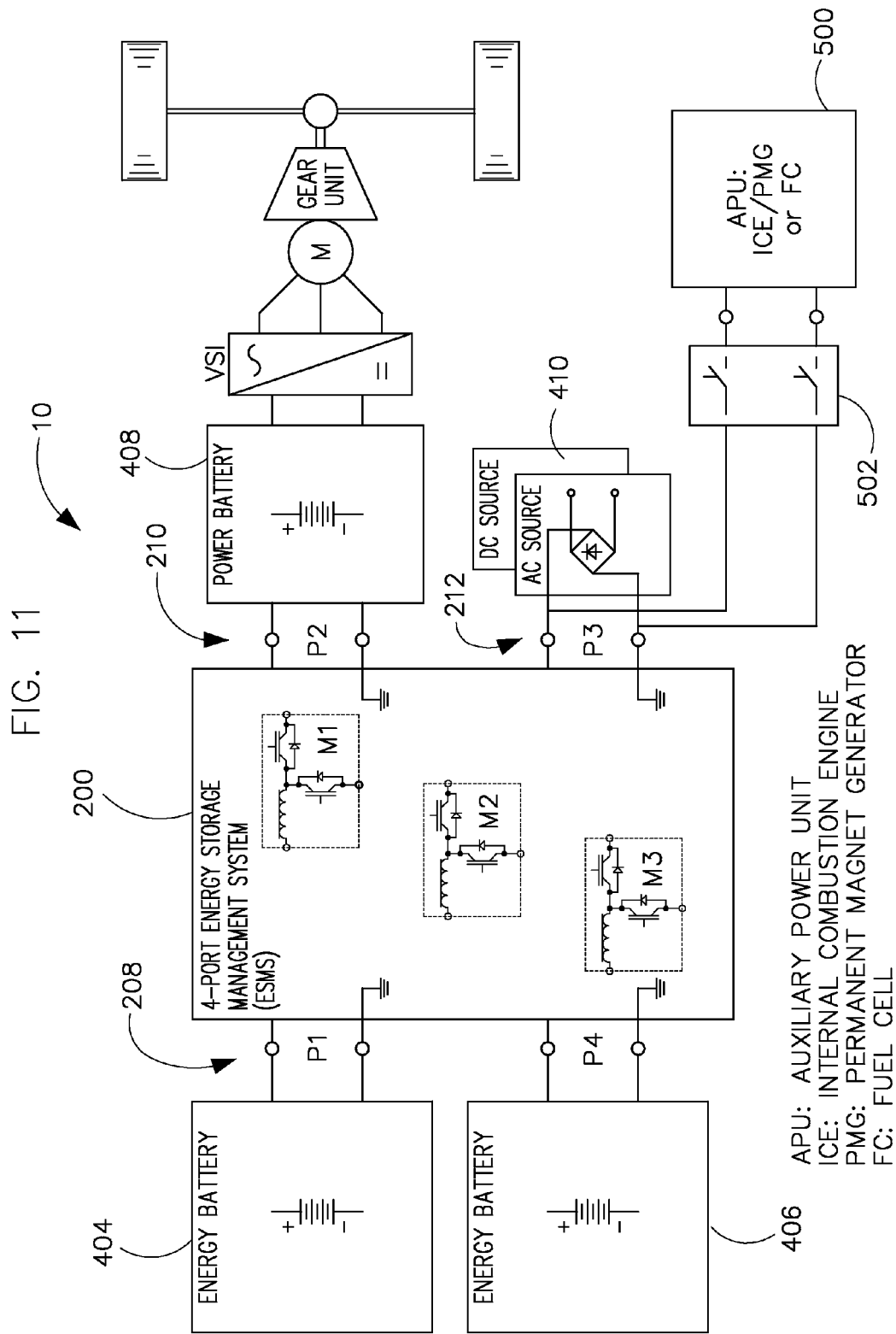
FIG. 11 is a schematic block diagram of an electric vehicle (EV) having an auxiliary power unit (APU) incorporating embodiments of the invention.

In another embodiment of the invention, referring to FIG. 11, vehicle 10 includes APU 500 positioned thereon that is switchably coupleable to port P3 212. That is, APU 500 is an auxiliary unit positioned on vehicle 10 but, instead of being coupled to ESMS 200 via port 1 208 as in FIG. 10, APU 500 is coupled to port P3 212 via a switching device 502. Thus, according to this invention, instead of having port P1 208 dedicated to providing power from APU 500, port P1 208 may be dedicated to coupling an energy battery or an ultracapacitor 404 as in previous illustrations, and port P3 212 may be used for providing charging from a stationary source 410 as well as providing auxiliary power during vehicle operation. That is, by coupling APU 500 through charging port P3 212, additional flexibility of operation is provided because energy can be drawn for vehicle operation via heat engine 12, energy batteries 404, 406, power battery 408, as well as from APU 500. When stationary, switching device 502 may be switched to enable re-charge from a stationary source 410.

Thus, overall charging control can be extended beyond a stationary case where AC/DC power is provided from the grid via stationary supply 410. Charging control strategies can be centralized, which allows interoperability of different battery chemistries on one electric vehicle system. That is, because of the sensor feedback, limit information for specific battery types and energy storage types, and because of the ability to obtain and use device parameter information in realtime during vehicle operation, system flexibility is improved and efficiency is optimized, which is all provided through a single centralized energy storage and managements system.

A technical contribution for the disclosed apparatus is that it provides for a controller implemented technique of charging energy storage devices of an electric vehicle using a multiport energy management system, based on system feedback.

One skilled in the art will appreciate that embodiments of the invention may be interfaced to and controlled by a computer readable storage medium having stored thereon a computer program. The computer readable storage medium includes a plurality of components such as one or more of electronic components, hardware components, and/or computer software components. These components may include one or more computer readable storage media that generally stores instructions such as software, firmware and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not list may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

According to one embodiment of the invention, an electric vehicle includes a controller configured to receive sensor feedback from a high voltage storage device and from a low voltage storage device, compare the sensor feedback to operating limits of the respective high and low voltage storage device, determine, based on the comparison a total charging current to the high voltage storage device and to the low voltage storage device and a power split factor of the total charging current to the high voltage device and to the low voltage device, and regulate the total power to the low voltage storage device and the high voltage storage device based on the determination.

In accordance with another embodiment of the invention, a method of managing an energy storage system for an electric vehicle includes receiving sensor feedback from a high voltage energy storage device of the electric vehicle, comparing the sensor feedback from the high voltage energy storage device to an operating limit specific to the high voltage energy storage device, receiving sensor feedback from a low voltage energy storage device of the electrical vehicle, comparing the sensor feedback from the low voltage energy storage device to an operating limit specific to the low voltage energy storage device, determining, based on the comparison from the high voltage device and from the low voltage device a total charging current to the high voltage storage device and to the low voltage storage device and a power split factor of the total charging current to the high voltage device and to the low voltage device, and regulating the total power to the low voltage storage device and the high voltage storage device based on the determination.

In accordance with yet another embodiment of the invention, a computer readable storage medium coupled to an energy storage and management system (ESMS) of an electric vehicle (EV) and having stored thereon a computer program comprising instructions which when executed by a computer cause the computer to receive sensor feedback from a high voltage energy storage device of the EV and from a low voltage energy storage device of the EV, compare the sensor feedback to operating limits of the respective energy storage devices, determine, based on the comparison a total charging current to the energy storage devices and a power split factor of the total charging current between the high voltage device and the low voltage device, and regulate the total power to the energy storage devices based on the determination.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An electric vehicle comprising:
    a controller configured to:
        receive sensor feedback from a high voltage storage device and from a low voltage storage device;
        compare the sensor feedback to operating limits of the respective high and low voltage storage device;
        determine, based on the comparison:
            a total charging current to the high voltage storage device and to the low voltage storage device; and
            a power split factor of the total charging current to the high voltage storage device and to the low voltage storage device; and
        regulate the total power to the low voltage storage device and the high voltage storage device based on the determination.

2. The system of claim 1 comprising an energy storage and management system (ESMS) comprising:
    a plurality of energy ports, ESMS comprising a plurality of DC electrical converters, each DC electrical converter configured to step up and to step down a DC voltage, wherein:
        a first port of the plurality of energy ports is a high voltage port couplable to stepped-up voltage sides of each of the DC electrical converters;
        a second port of the plurality of energy ports is a low voltage port couplable to stepped-down voltage sides of each of the DC electrical converters; and
        at least one of the plurality of energy ports is coupleable to an electrical charging system;
    the high voltage storage device coupled to the first port;
    the low voltage storage device coupled to the second port; and
    an electrical charging system coupled to one of the plurality of energy ports.

3. The system of claim 2 wherein the electrical charging system is an auxiliary power unit positioned on the electric vehicle and configured to output electrical power to the power electronic conversion system while the vehicle is in motion.

4. The system of claim 2 wherein the controller is configured to:
    determine a voltage of each of the plurality of energy ports;
    determine the power split factor based on the determined voltages of each respective energy port.

5. The system of claim 1 wherein the controller is configured to:
    continuously receive the sensor feedback from the high and from the low voltage storage devices;
    compare the continuously received sensor feedback to the operating limits of the respective high and low voltage storage devices;
    revise the determined total charging current and the power split factor; and
    regulate power to the low voltage storage device and the high voltage storage device based on the revised determination.

6. The system of claim 1 wherein the controller is configured to determine the power split factor such that, when regulating power to the high voltage and to the low voltage storage devices, power is directed to only one of the high and low voltage storage devices.

7. The system of claim 1 wherein the operating limits of the respective high and low voltage storage devices are comprised of at least one of an electrical current limit and a maximum temperature corresponding to each of the respective high and low voltage storage devices.

8. The system of claim 1 wherein the controller is configured to regulate a fan positioned to blow air over one of the high and the low voltage storage devices bases on the sensor feedback.

9. The system of claim 1 comprising a power device coupled to the high voltage storage device and the low voltage storage device, wherein the power device comprises one of a vehicle drivetrain, an uninterrupted power supply, a mining vehicle drivetrain, a mining apparatus, a marine system, and an aviation system.

10. A method of managing an energy storage system for an electric vehicle comprising:
   receiving sensor feedback from a high voltage energy storage device of the electric vehicle;
   comparing the sensor feedback from the high voltage energy storage device to an operating limit specific to the high voltage energy storage device;
   receiving sensor feedback from a low voltage energy storage device of the electrical vehicle;
   comparing the sensor feedback from the low voltage energy storage device to an operating limit specific to the low voltage energy storage device;
   determining, based on the comparison from the high voltage energy storage device and from the low voltage energy storage device:
      a total charging current to the high voltage energy storage device and to the low voltage energy storage device; and
      a power split factor of the total charging current to the high voltage energy storage device and to the low voltage energy storage device; and
   regulating the total power to the low voltage energy storage device and the high voltage energy storage device based on the determination.

11. The method of claim 10 comprising obtaining energy storage device parameter information and determining the total charging current and the power split factor based on the energy storage device parameter information, wherein the energy storage parameter information includes a state of charge and current operating voltage corresponding to each of the respective high and low voltage energy storage devices.

12. The method of claim 10 wherein the operating limits for the high voltage energy storage device and the low voltage energy storage device include at least one of an electrical current limit and a maximum temperature corresponding to each of the respective high and low voltage energy storage devices.

13. The method of claim 10 comprising regulating the total power to the low voltage energy storage device and the high voltage energy storage device from an auxiliary power unit that is positioned on the electric vehicle.

14. The method of claim 10 wherein the high voltage energy storage device is a power battery having an operational voltage at 400 V or greater, and the low voltage energy storage device is one of an energy battery and an ultracapacitor having an operational voltage at 120 V or less.

15. A non-transitory computer readable storage medium coupled to an energy storage and management system (ESMS) of an electric vehicle (EV) and having stored thereon a computer program comprising instructions which when executed by a computer cause the computer to:
   receive sensor feedback from a high voltage energy storage device of the EV and from a low voltage energy storage device of the EV;
   compare the sensor feedback to operating limits of the respective energy storage devices;
   determine, based on the comparison:
      a total charging current to the energy storage devices; and
      a power split factor of the total charging current between the high voltage energy storage device and the low voltage energy storage device; and
   regulate the total power to the energy storage devices based on the determination.

16. The non-transitory computer readable storage medium of claim 15 wherein computer is further caused to regulate the total power to the energy storage devices from an auxiliary unit positioned on the EV and coupled to a port of the ESMS.

17. The non-transitory computer readable storage medium of claim 15 wherein the computer is further caused to determine a voltage of each of a plurality of energy ports of the ESMS, and determine the power split factor based on the determined voltages of each respective energy port.

18. The non-transitory computer readable storage medium of claim 15 wherein the computer is further caused to:
   continuously receive the sensor feedback from the high and from the low voltage energy storage devices;
   compare the continuously received sensor feedback to the operating limits of the respective high and low voltage energy storage devices;
   revise the determined total charging current and the power split factor; and
   regulate the total power to the energy storage devices based on the revision.

19. The non-transitory computer readable storage medium of claim 15 wherein the operating limits of the respective high and low voltage energy storage devices are comprised of at least one of an electrical current limit and a maximum temperature corresponding to each of the respective high and low voltage energy storage devices.

20. The non-transitory computer readable storage medium of claim 15 wherein the computer is further caused to regulate a fan positioned to blow air over one of the high and the low voltage energy storage devices bases on the sensor feedback.

21. The method of claim of claim 10 comprising:
   coupling the high voltage energy storage device to a first port of a plurality of energy ports of an energy storage and management system (ESMS), wherein the first port is a high voltage port coupleable to stepped-up voltage sides of each of a plurality of DC electrical converters;
   coupling the low voltage energy storage device to a second port of the plurality of energy ports of the ESMS, wherein the second port is a low voltage port coupleable to stepped-down voltage sides of each of the plurality of DC electrical converters; and
   coupling an electrical charging system to one of the plurality of energy ports of the ESMS.

* * * * *